US010399563B2

(12) United States Patent
Nogimori

(10) Patent No.: US 10,399,563 B2
(45) Date of Patent: Sep. 3, 2019

(54) DRIVING SUPPORT APPARATUS, DRIVING SUPPORT METHOD, AND COMPUTER PROGRAM PRODUCT

(71) Applicant: AISIN SEIKI KABUSHIKI KAISHA, Kariya-shi, Aichi (JP)

(72) Inventor: Wataru Nogimori, Inazawa (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 118 days.

(21) Appl. No.: 15/542,706

(22) PCT Filed: Dec. 24, 2015

(86) PCT No.: PCT/JP2015/086010
§ 371 (c)(1),
(2) Date: Jul. 11, 2017

(87) PCT Pub. No.: WO2016/117272
PCT Pub. Date: Jul. 28, 2016

(65) Prior Publication Data
US 2017/0369053 A1 Dec. 28, 2017

(30) Foreign Application Priority Data

Jan. 19, 2015 (JP) .................. 2015-008101

(51) Int. Cl.
*B60W 30/09* (2012.01)
*B60T 7/12* (2006.01)
(Continued)

(52) U.S. Cl.
CPC ............. *B60W 30/09* (2013.01); *B60K 28/02* (2013.01); *B60K 28/06* (2013.01); *B60R 11/02* (2013.01);
(Continued)

(58) Field of Classification Search
CPC ....... B60W 30/09; B60W 30/08; B60K 28/02; B60K 28/06; B60R 11/02; B60R 21/00; B60T 7/12
See application file for complete search history.

(56) References Cited

U.S. PATENT DOCUMENTS

2005/0030184 A1   2/2005  Victor
2008/0185207 A1   8/2008  Kondoh
2014/0144491 A1*  5/2014  Galliano ............. B29C 37/0078
                                                     136/252

FOREIGN PATENT DOCUMENTS

JP   02-254030 A   10/1990
JP   06-171391 A    6/1994
(Continued)

OTHER PUBLICATIONS

International Search Report for PCT/JP2015/086010, dated Mar. 8, 2016.
(Continued)

*Primary Examiner* — Michael D Lang
(74) *Attorney, Agent, or Firm* — Sughrue Mion, PLLC

(57) ABSTRACT

A driving support apparatus according the embodiment includes: a determination unit that determines driving support control having a driving support resource amount that is capable of assuring required resources with respect to a resource amount that is capable of being assured by a level of a vehicle driver's concentration on driving, the required resources being assumed to be required for safe driving; and a driving support unit that changes the driving support control to be performed to driving support control that is determined by the determination unit to be capable of assuring the required resources.

6 Claims, 9 Drawing Sheets

(51) Int. Cl.

| | | |
|---|---|---|
| *B60R 11/02* | (2006.01) | |
| *B60R 21/00* | (2006.01) | |
| *G08B 21/06* | (2006.01) | |
| *G08G 1/16* | (2006.01) | |
| *B60W 30/08* | (2012.01) | |
| *B60W 30/085* | (2012.01) | |
| *B60W 30/095* | (2012.01) | |
| *B60W 30/14* | (2006.01) | |
| *B60W 30/18* | (2012.01) | |
| *B60W 50/08* | (2012.01) | |
| *B60K 28/02* | (2006.01) | |
| *B60K 28/06* | (2006.01) | |
| *B60W 30/12* | (2006.01) | |
| *B60W 40/08* | (2012.01) | |

(52) U.S. Cl.
CPC ............... *B60R 21/00* (2013.01); *B60T 7/12* (2013.01); *B60W 30/08* (2013.01); *B60W 30/085* (2013.01); *B60W 30/095* (2013.01); *B60W 30/12* (2013.01); *B60W 30/14* (2013.01); *B60W 30/143* (2013.01); *B60W 30/18036* (2013.01); *B60W 50/087* (2013.01); *G08B 21/06* (2013.01); *G08G 1/16* (2013.01); *G08G 1/166* (2013.01); *G08G 1/167* (2013.01); *G08G 1/168* (2013.01); *B60W 2040/0818* (2013.01); *B60W 2040/0827* (2013.01); *B60W 2040/0872* (2013.01); *B60W 2540/22* (2013.01); *B60W 2540/26* (2013.01); *B60W 2540/30* (2013.01); *B60W 2550/10* (2013.01); *B60W 2710/18* (2013.01); *B60W 2710/20* (2013.01); *B60W 2720/10* (2013.01)

(56) References Cited

FOREIGN PATENT DOCUMENTS

| | | |
|---|---|---|
| JP | 06-274798 A | 9/1994 |
| JP | 2001-219760 A | 8/2001 |
| JP | 2008-120271 A | 5/2008 |
| JP | 2008-213823 A | 9/2008 |

OTHER PUBLICATIONS

Communication dated Nov. 20, 2017 from the European Patent Office in counterpart application No. 15878961.0.

* cited by examiner

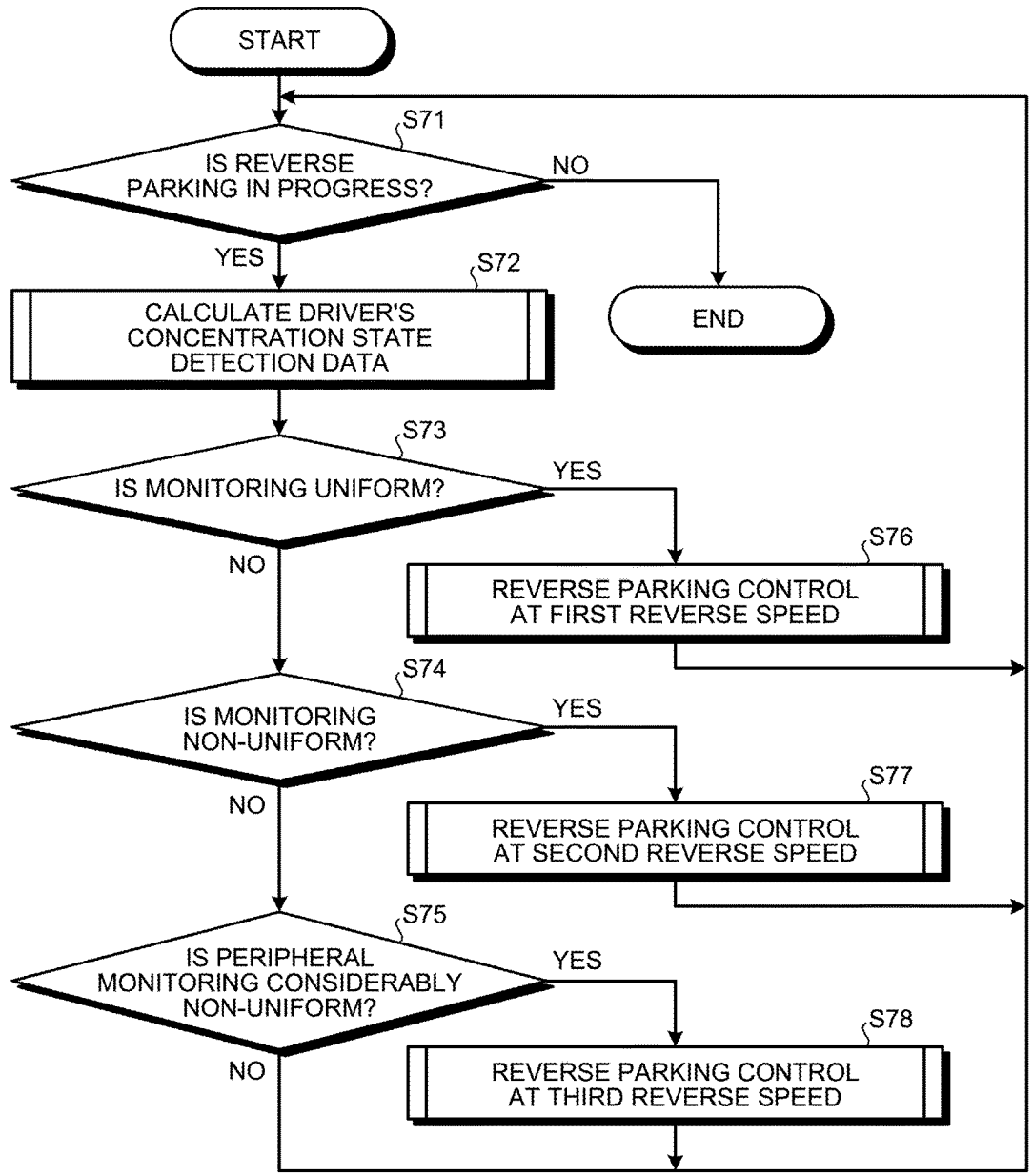

DRIVING SUPPORT APPARATUS, DRIVING SUPPORT METHOD, AND COMPUTER PROGRAM PRODUCT

CROSS-REFERENCE TO RELATED APPLICATIONS

This application is national stage application of International Application No. PCT/JP2015/086010, filed Dec. 24, 2015, which designates the United States, incorporated herein by reference, and which claims the benefit of priority from Japanese Patent Application No. 2015-008101, filed Jan. 19, 2015, the entire contents of which are incorporated herein by reference.

TECHNICAL FIELD

Embodiments of the present invention relates to a driving support apparatus, driving support method, and computer program product.

BACKGROUND ART

There has been known a driving support technique that supports driving by a driver when, for example, a vigilance level of the driver is reduced.

CITATION LIST

Patent Literature

Patent Document 1: Japanese Patent Application Laid-open No. 2001-219760
Patent Document 2: Japanese Patent Application Laid-open No. H6-171391
Patent Document 3: Japanese Patent Application Laid-open No. H2-254030
Patent Document 4: Japanese Patent Application Laid-open No. H6-274798
Patent Document 5: Japanese Patent Application Laid-open No. 2008-120271

SUMMARY OF INVENTION

Problem to be Solved by the Invention

The driving support technique is intended, to begin with, to support driving of a driver. Thus, the driving support technique should generally follow intention of the driver.

The conventional driving support technique, however, uniformly determines a state of the driver to be good or bad. The conventional driving support technique thus does not necessarily provide the driving support in line with the driver's intention.

Thus, preferably, the driving support technique performs driving support control as necessary in accordance with, for example, the state of the driver's concentration on driving, thereby assuring safety.

Means for Solving Problem

A driving support apparatus of the embodiment comprises a determination unit that determines driving support control having a driving support resource amount that is capable of assuring required resources with respect to a resource amount that is capable of being assured by a level of a vehicle driver's concentration on driving, the required resources being assumed to be required for safe driving; and a driving support unit that changes the driving support control to be performed to driving support control that is determined by the determination unit to be capable of assuring the required resources.

The driving support apparatus of the embodiment performs the driving support control in which the driving support resource amount that can be assured by a driving support system is sufficient for assuring the required resources that are assumed to be required for safe driving with respect to the resource amount that can be assured by the level of the vehicle driver's concentration on driving. Thus, safe driving can be performed without the driver's excessive reliance on the driving support apparatus.

In the driving support apparatus, the determination unit may include: a first determination unit that determines the level of the vehicle driver's concentration on driving; and a second determination unit that determines driving support control in which a sum of the resource amount that is capable of being assured by the level of the driver's concentration on driving and the driving support resource amount is equal to or more than the required resources that are assumed to be required for safe driving.

The foregoing configuration enables the determination unit to reliably determine the type of driving support control that results in the required resources that are assumed to be required for safe driving depending on the level of the driver's concentration on driving being exceeded.

In the driving support apparatus, a plurality of types of collision damage reduction brake control are capable of being performed as the driving support control, the types of collision damage reduction brake control each involving a specific estimated point in time at which collision with an estimated target object occurs, the first determination unit may determine a drowsiness level as the level of concentration, and the second determination unit may identify, based on the determined drowsiness level, among the types of collision damage reduction brake control involving different time periods at which collision with an estimated target object occurs, collision damage reduction brake control that is determined to result in more than the required resources.

The foregoing configuration enables an optimum type of collision damage reduction brake control to be performed in the drowsiness level of the driver in accordance with the drowsiness level of the driver.

In the driving support apparatus, a plurality of types of lane running control are capable of being performed as the driving support control, the types of lane running control each involving a specific estimated point in time at which collision with a following vehicle occurs after a lane change, the first determination unit may determine a peripheral monitoring level of the driver as the level of concentration, and the second determination unit may identify, based on the determined peripheral monitoring level, among the types of lane running control involving different estimated points in time at which collision with the following vehicle occurs after the lane change, lane running control including lane changing that results in more than the required resources.

The foregoing configuration enables a type of lane running control that gives the driver a less sense of awkwardness to be performed in accordance with the peripheral monitoring level of the driver.

In the driving support apparatus, when the determined peripheral monitoring level is such that peripheral monitoring and safety confirmation are barely performed, the second determination unit may determine follow-up running control as the lane running control.

The foregoing configuration allows the follow-up running control to be performed instead of the lane running control including lane changing, so that steady driving support control can be performed while greater safety is being assured.

In the driving support apparatus, a plurality of types of adaptive cruise control are capable of being performed as the driving support control, the types of adaptive cruise control each involving a specific estimated point in time at which collision with an estimated target object occurs, the first determination unit may determine a peripheral monitoring level of the driver as the level of concentration, and the second determination unit may identify, based on the determined peripheral monitoring level, among the types of adaptive cruise control involving different estimated points in time at which collision with the estimated target object occurs, adaptive cruise control that results in more than the required resources.

Thus, a type of adaptive cruise control that assures safety even more reliably can be performed.

In the driving support apparatus, reverse parking speed control is capable of being performed as the driving support control, the first determination unit may determine a peripheral monitoring level of the driver as the level of concentration, and the second determination unit may identify, based on the determined peripheral monitoring level, among a plurality of reverse parking speeds, reverse parking speed control having a reverse parking speed that results in more than the required resources.

The foregoing configuration enables a type of reverse parking speed control that assures safety even more reliably to be performed depending on the peripheral monitoring level of the driver.

In the driving support apparatus, the first determination unit may determine the peripheral monitoring level based on a ratio at which the driver looks forward, a ratio at which the driver looks left rearward, and a ratio at which the driver looks right rearward.

The foregoing configuration enables a type of reverse parking speed control that assures safety even more reliably to be performed through a reliable determination of the peripheral monitoring level of the driver during reverse parking.

In the driving support apparatus, the first determination unit may determine the peripheral monitoring level based on further a ratio at which the driver looks at a rear camera image displayed on a display unit.

The foregoing configuration enables a type of reverse parking speed control that assures safety even more reliably to be performed through a reliable determination of the peripheral monitoring level of the driver required during reverse parking.

A driving support method of the embodiment comprises: determining driving support control having a driving support resource amount that is capable of assuring required resources with respect to a resource amount that is capable of being assured by a level of a vehicle driver's concentration on driving, the required resources being assumed to be required for safe driving; and changing the driving support control to be performed to driving support control that is determined to be capable of assuring the required resources.

Thus, the driving support method according to the embodiment performs the driving support control in which the driving support resource amount that can be assured by a driving support system is sufficient for assuring the required resources that are assumed to be required for safe driving with respect to the resource amount that can be assured by the level of the vehicle driver's concentration on driving. Thus, safe driving can be performed without the driver's excessive reliance on the driving support apparatus.

A computer program product of the embodiment including programmed instructions embodied in and stored on a non-transitory computer readable medium, wherein the instructions, when executed by a computer, cause the computer to perform determining driving support control having a driving support resource amount that is capable of assuring required resources with respect to a resource amount that is capable of being assured by a level of a vehicle driver's concentration on driving, the required resources being assumed to be required for safe driving; and changing the driving support control to be performed to driving support control that is determined to be capable of assuring the required resources.

Thus, the computer program product according to the embodiment performs the driving support control in which the driving support resource amount that can be assured by a driving support system is sufficient for assuring the required resources that are assumed to be required for safe driving with respect to the resource amount that can be assured by the level of the vehicle driver's concentration on driving. Thus, safe driving can be performed without the driver's excessive reliance on the driving support apparatus.

BRIEF DESCRIPTION OF DRAWINGS

FIG. 10 is an operation flowchart (part 3) in the embodiment.

DESCRIPTION OF EMBODIMENTS

An embodiment will be described below with reference to the accompanying drawings.

Figure 1:
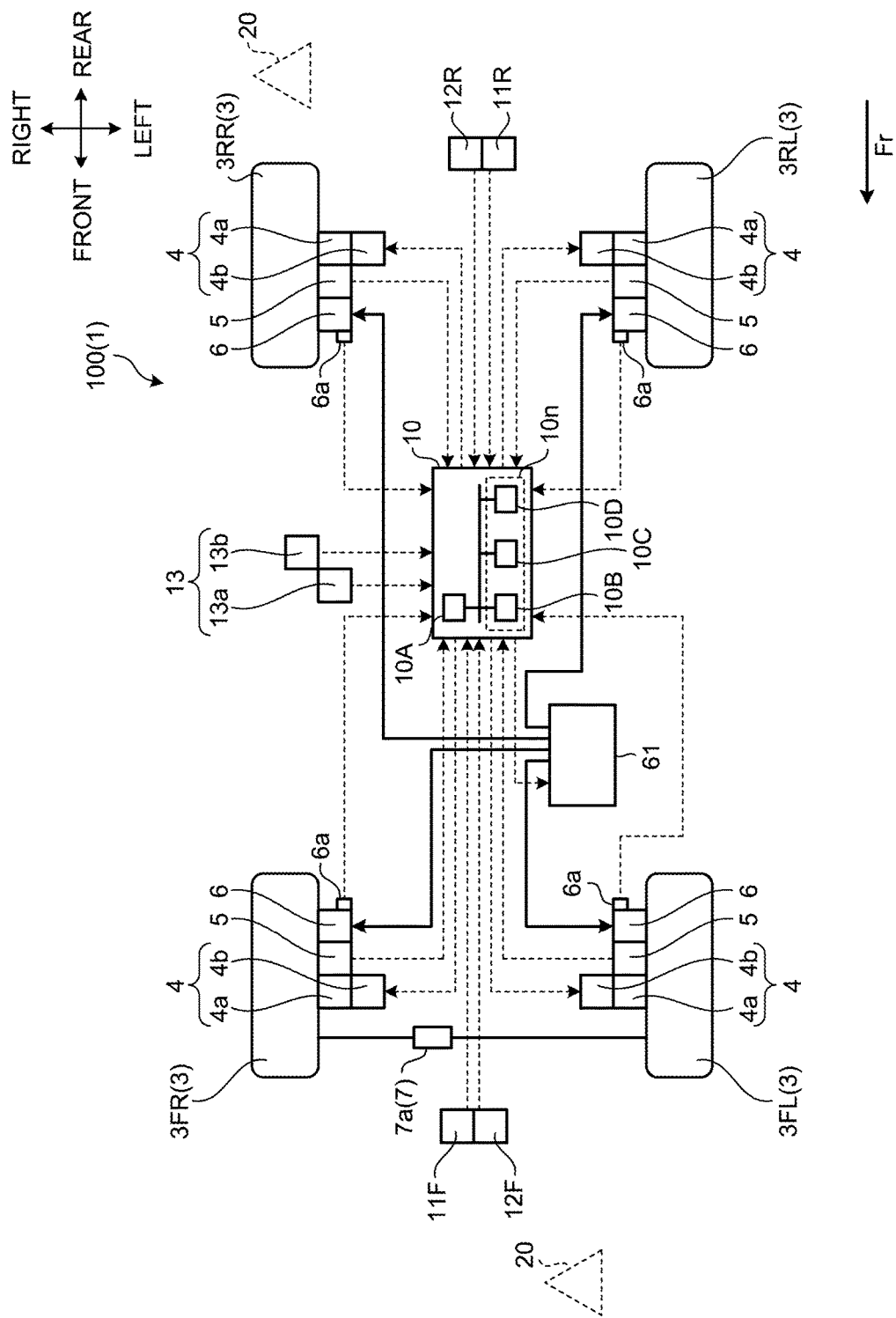
FIG. 1 is a schematic configuration block diagram of a vehicle on which a driving support apparatus according to an embodiment is mounted.

FIG. 1 is a schematic configuration block diagram of a vehicle on which a driving support apparatus according to an embodiment is mounted.

A vehicle 1 is configured as a four-wheeled vehicle that includes left and right two front wheels 3FL and 3FR and left and right two rear wheels 3RL and 3RR.

The vehicle 1 is provided with a driving support system 100 mounted thereon. The driving support system 100 functions as a collision avoidance control system and an automatic detouring system.

The driving support system 100 generally includes a control unit 10, imaging units 11F and 11R, radar units 12F and 12R, acceleration sensors 13a and 13b (13), and a brake system 61. The driving support system 100 further includes a suspension unit 4, a rotation sensor 5, a brake unit 6, and a steering unit 7 associated with each of the two front wheels 3FL and 3FR.

The driving support system 100 further includes a suspension unit 4, a rotation sensor 5, and a brake unit 6 associated with each of the two rear wheels 3RL and 3RR. It is here noted that, although the vehicle 1 includes other basic elements required as a vehicle in addition to those illustrated in FIG. 1, the following describes only a configuration relating to the driving support system 100 and control relating to the configuration.

The control unit 10 (control unit) functions as a driving support control apparatus. The control unit 10, while receiving signals and data from different elements of the driving support system 100, controls the different elements of the driving support system 100.

The control unit 10 is also configured as what is called a computer. More specifically, the control unit 10 includes an arithmetic processor 10A and a storage 10n.

In the above configuration, the arithmetic processor 10A is configured specifically as a microprocessor or an electronic control unit (ECU).

The storage 10n includes, for example, a read only memory (ROM) 10B, a random access memory (RAM) 10C, or a flash memory 10D.

The arithmetic processor 10A can load a program stored (installed) in a nonvolatile storage 10n (e.g., the ROM 10B or the flash memory 10D) and execute arithmetic processing in accordance with the program, thereby being capable of functioning (operating) as the different elements illustrated in FIG. 1. Additionally, the storage 10n, for example, the RAM 10C, stores therein data (e.g., tables (groups of data) or functions) used for various arithmetic operations relating to control and results of arithmetic operations (including values obtained in the middle of arithmetic operations).

The imaging units 11F and 11R are each configured as a digital camera incorporating an imaging device such as a charge coupled device (CCD) and a CMOS image sensor (CIS).

The imaging units 11F and 11R can each output image data (moving image data and still image data) at a predetermined frame rate.

The imaging unit 11F is disposed at an anterior position in a vehicle body not illustrated. Specifically, the imaging unit 11F is disposed at, for example, a front bumper. The imaging unit 11F thereby outputs image data including an estimated target object 20 that may, for example, be another vehicle that can be an obstacle ahead of the vehicle 1.

Similarly, the imaging unit 11R is disposed at, for example, a posterior position in the vehicle body not illustrated. Specifically, the imaging unit 11R is disposed at, for example, a rear bumper. The imaging unit 11R thereby outputs image data including the estimated target object 20 that may, for example, be another vehicle that can be an obstacle in rear of the vehicle 1.

The image data output from the imaging units 11F and 11R constitutes data that serves as a basis for detecting the estimated target object 20 that can be an obstacle.

The radar units 12F and 12R are each configured, for example, as a millimeter-wave radar apparatus.

The radar units 12F and 12R each output distance data and speed data. Specifically, the distance data indicates a spaced distance Ld from the estimated target object 20 (spaced distance, detected distance; see FIG. 7) and the speed data indicates relative speed (speed) with respect to the estimated target object 20. It is here noted that the distance data and the speed data constitute data that serves as a basis for detecting the estimated target object 20. Additionally, the radar units 12F and 12R are exemplary estimated target object detecting unit and data acquisition unit. It is noted that the control unit 10 updates measurement results of the spaced distance Ld between the vehicle 1 and the estimated target object 20 taken by radar units 12 and stores the updated measurement results in the storage 10n from time to time (e.g., at predetermined time intervals), thereby being capable of using the updated measurement results of the spaced distance Ld for arithmetic operations.

The acceleration sensors 13 include the acceleration sensor 13a that acquires acceleration in an anterior-posterior direction of the vehicle 1 and the acceleration sensor 13b that acquires acceleration in a lateral direction of the vehicle 1.

The suspension unit (suspension) 4 is disposed between a wheel 3 and the vehicle body not illustrated. The suspension unit 4 reduces vibration and impact from a road surface transmitted to the vehicle body. More specifically, the suspension unit 4 includes a shock absorber 4a that can electrically control (adjust) a damping characteristic. The control unit 10 outputs an instruction signal to control an actuator 4b, thereby being capable of changing the damping characteristic of the shock absorber 4a. The suspension unit 4 is provided for each of the four wheels 3 (two front wheels 3FL and 3FR and two rear wheels 3RL and 3RR). This arrangement allows the control unit 10 to control the damping characteristics of the four wheels 3 independently of each other, so that the control unit 10 can control the damping characteristics that may be different from each other.

The rotation sensor 5 is configured as, for example, a rotational speed sensor, an angular velocity sensor, or a wheel sensor. The rotation sensor 5 outputs a signal that corresponds to a rotational speed, an angular velocity, the number of revolutions, or a rotational state of each of the four wheels 3. Using a result of detection made (output signal) by the rotation sensor 5, the control unit 10 can acquire a slip ratio of each of the four wheels 3 and determines, for example, whether they are in a locked state. Additionally, the control unit 10 acquires speed of the vehicle 1 from the result of detection made by the rotation sensor 5. It is noted that a rotation sensor that detects rotation of, for example, a crankshaft or an axle may be provided, in addition to the rotation sensor 5 for the wheels 3. The control unit 10 may, in this case, acquire the speed of the vehicle 1 from a result of detection made by such a rotation sensor.

The brake unit 6 (brake, hydraulic system) is provided for each of the four wheels 3 and brakes a wheel 3 associated therewith. The brake unit 6 is controlled by the brake system 61 that is configured, for example, as an anti-lock brake system (ABS).

The steering unit 7 steers the front wheels 3FL and 3FR. The control unit 10 controls an actuator 7a using an instruction signal, thereby changing a steering angle (turning angle) of the front wheels 3FL and 3FR.

The configuration of the driving support system 100 described above is illustrative only and may be embodied in various ways. Well-known devices can be used as the individual elements that constitute the driving support system 100. Additionally, each element of the driving support system 100 may be shared with other configurations. The driving support system 100 may also be provided with a sonar apparatus serving as an obstacle detection unit and a data acquisition unit.

The following describes a basic concept of driving support control in the embodiment.

Figure 2:
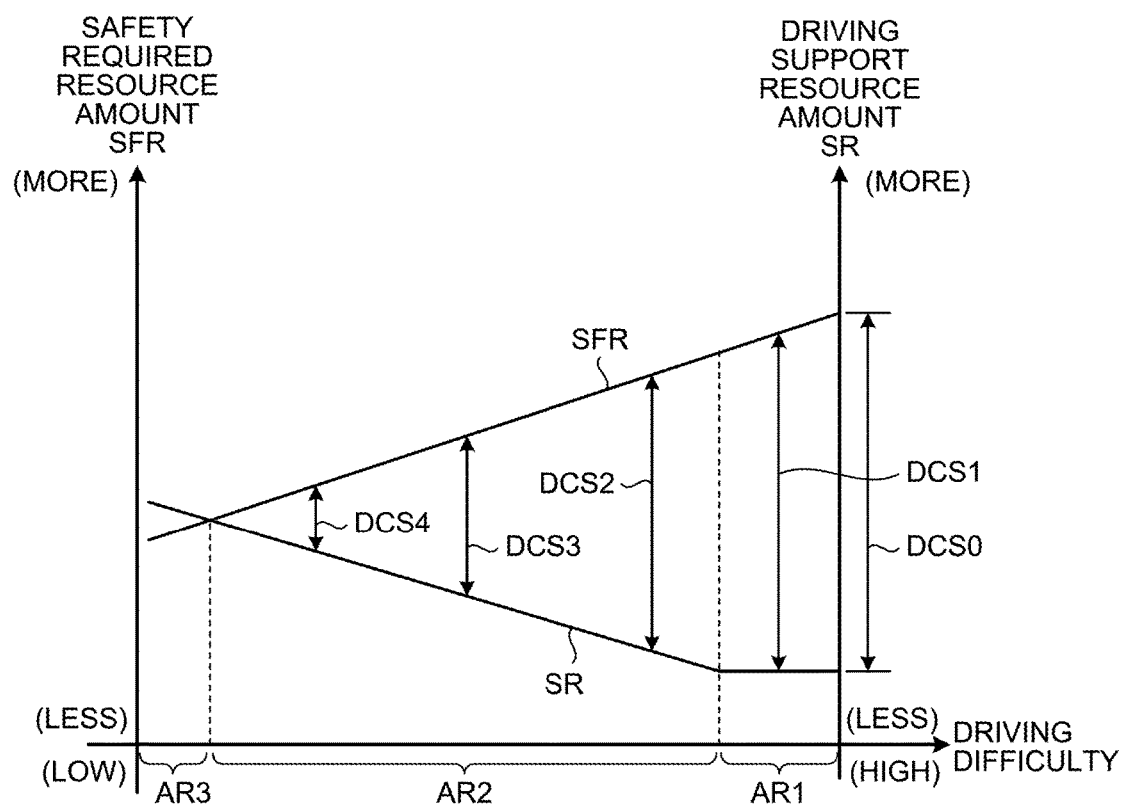
FIG. 2 is a chart illustrating a basic concept of a level of a driver's concentration on driving and a level of support offered by a driving support system.

FIG. 2 is a chart illustrating a basic concept of a level of the driver's concentration on driving and a level of support offered by the driving support system.

The basic attitude toward designing the driving support system 100 in the embodiment is such that the vehicle 1 is to operate in line with the intention of the driver and the system is involved in driving to the minimum essential extent required for assuring safety. Furthermore, the driving support system 100 is designed so as to operate to prioritize the intention of the driver so that driving by the driver as a user does not excessively rely on the driving support system 100.

In FIG. 2, the abscissa represents driving difficulty. The term driving difficulty as used herein refers to an index indicating difficulty in driving depending on the speed of the vehicle 1, environmental complexity (e.g., peripheral vehicle traffic, the number of curves, road width, paved or unpaved road, and frozen road), and weather (e.g., fine weather, rainfall, and snowfall).

In FIG. 2, a required resource amount SFR that is assumed to be required for performance of safe driving and a safety amount (safe driving support resource amount) SR that can be assured by the driving support system 100 are expressed linearly for the sake of simplicity. However, the required resource amount SFR and the safety amount SR, even when expressed non-linearly, are similarly applicable.

Specifically, in the state on the right end, for example, the driver concentrates on driving, keeping his or her eyes straight on the road, with rarely looking aside. In contrast, in the state on the left end, for example, the driver falls asleep, hardly concentrating on driving.

As illustrated in FIG. 2, the driving support system 100 provides a smaller safety amount (driving support resource amount) SR that is capable of assuring safety with increasing driving difficulty, assuring a minimum essential of the required resource amount SFR that is assumed to be required for the performance of safe driving.

Thus, in FIG. 2, the driver is required to concentrate more on driving (and a higher vigilance level) toward a driving difficulty region (specifically, high driving difficulty region) on the right. Additionally, in FIG. 2, the driver is required to concentrate less on driving (and a lower vigilance level) toward a driving difficulty region (specifically, low driving difficulty region) on the left. Specifically, in the driving difficulty region on the right in FIG. 2, safe driving cannot be performed using the driving support system 100 when a level of the driver's concentration on driving is not high.

More specifically, levels of the driver's concentration on driving DCS0 to DCS4 required for the performance of safe driving are as follows:

$$DCS0 > DCS1 > DCS2 > DCS3 > DCS4.$$

Thus, in a driving difficulty region AR1 that requires higher levels of the driver's concentration on driving, in which the driving support system 100 is capable of assuring only a minimum essential of the driving support resource amount SR, the driving support system 100 automatically changes driving support details when the level of the driver's concentration on driving is lowered, so that the driving difficulty region is AR2 in which the driving support system 100 is capable of assuring safety. In other words, the driving support control is determined so that a sum of the resource amount that can be assured by the level of the driver's concentration on driving and the driving support resource amount is equal to or more than required resources and that the driving support system 100 automatically changes the driving support details.

When the level of the driver's concentration on driving for the performance of safe driving is lowered as illustrated on the left end in FIG. 2, the driving support system 100 performs, for example, control of a collision damage reduction brake, thereby assuring safety in a driving difficulty region AR3 in which the driving support system 100 is capable of assuring all of the required resource SFR that is assumed to be required for the performance of safe driving.

To achieve the driving support system 100 described above, the present embodiment incorporates a configuration that changes, in providing the driving support, the driving support details using the driver's vigilance level (drowsiness level), a state of the driver's concentration on driving, and a state of peripheral monitoring by the driver.

Before describing operations in the embodiment, the following describes the driver's vigilance level (drowsiness level), the state of the driver's concentration on driving, and the state of peripheral monitoring by the driver, together with the basic attitude toward the foregoing and the driving support.

The following describes the driver's vigilance level (drowsiness level).

The following describes, as a technique for determining the vigilance level, an evaluation method for estimating drowsiness, implemented by the New Energy and Industrial Technology Development Organization (NEDO).

Figure 3:
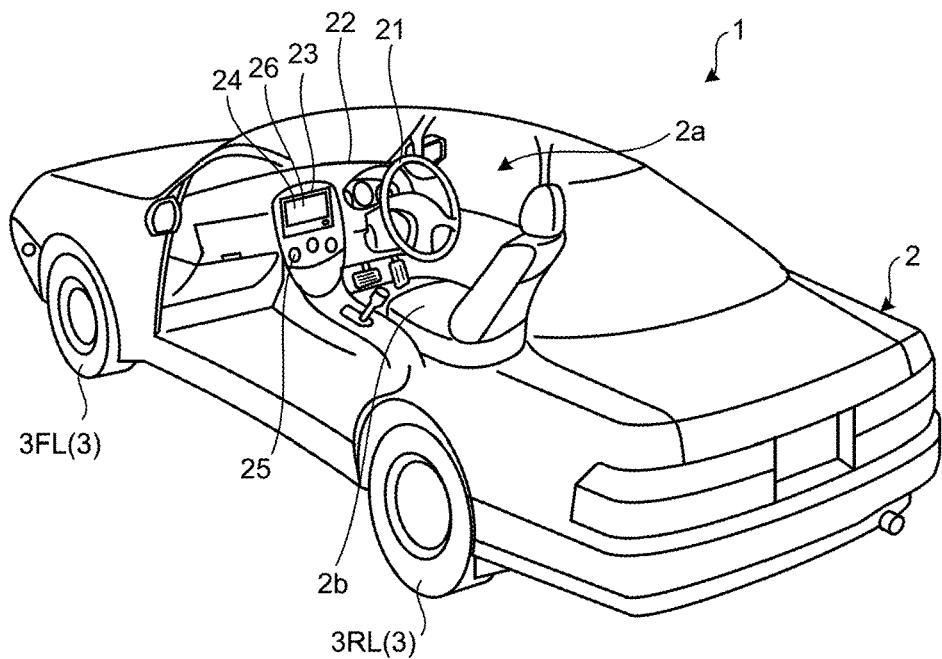
FIG. 3 is a partial perspective view of a vehicle compartment of the vehicle in the embodiment.

FIG. 3 is a partial perspective view of a vehicle compartment of the vehicle in the embodiment.

A vehicle body 2 of the vehicle 1 constitutes a vehicle compartment 2a in which the driver not illustrated rides. A steering portion 21 is disposed in the vehicle compartment 2a under a condition in which the steering portion 21 faces a driver's seat 2b. The steering portion 21 is configured, for example, as a steering wheel that protrudes from a dashboard (instrument panel) 22.

A monitor unit 23 is disposed at a central portion in a vehicle width direction, specifically, in a lateral direction of the dashboard 22 inside the vehicle compartment 2a. The monitor unit 23 includes a display unit 24 and an audio output unit 25.

A liquid crystal display (LCD) or an organic electroluminescent display (OELD), for example, is used as the display unit 24. Additionally, the display unit 24 includes a transparent operation input portion 26, such as a touch panel, disposed on a front surface side thereof. An operator, such as the driver, uses his or her finger to touch, press, move, or otherwise operate the operation input portion 26 at a position on a display screen of the display unit 24 corresponding to an image displayed thereon. This operation constitutes an operating input.

The audio output unit 25 includes, for example, an amplifier that amplifies an audio signal corresponding to guidance voice or warning sound and a speaker that outputs audio.

An occupant can then visually recognize the image displayed via the operation input portion 26 on the display screen of the display unit 24 (e.g., a vehicle rearward image by the imaging unit 11R).

Figure 4:
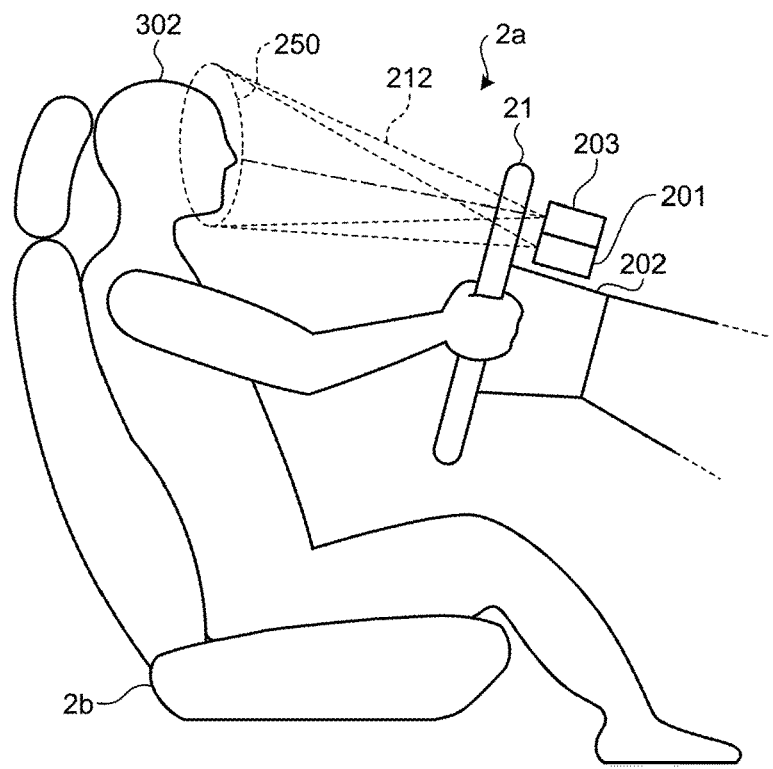
FIG. 4 is a diagram illustrating disposition of an in-vehicle imaging unit and an infrared irradiation unit in the embodiment.

FIG. 4 is a diagram illustrating disposition of an in-vehicle imaging unit and an infrared irradiation unit in the embodiment.

As illustrated in FIG. 4, an in-vehicle imaging unit 201 and an infrared irradiation unit 203 are disposed on a steering column 202. The in-vehicle imaging unit 201 images an area near a face of a driver 302. The infrared irradiation unit 203 irradiates the area near the face of the driver 302 with infrared rays.

The in-vehicle imaging unit 201 is configured, for example, as a charge coupled device (CCD) camera compatible with imaging using infrared rays.

The infrared irradiation unit 203 includes, for example, a light emitting diode (LED) that emits infrared rays.

The in-vehicle imaging unit 201 is adjusted for a viewing angle and posture such that the face of the driver 302 sitting in the driver's seat 2b is disposed at a center of a field of vision. The infrared irradiation unit 203 is adjusted such that an optical axis of light emitted by the infrared irradiation unit 203 falls near the face of the driver 302 sitting in the driver's seat 2b.

As a result of the adjustment made of the infrared irradiation unit 203 described above, when a person sits down on the driver's seat 2b of the vehicle 1, the infrared irradiation unit 203 irradiates a range 250 over which the face is likely to exist with infrared rays 212. It may here be noted that the infrared rays 212 are not perceived as light by human eyes. Thus, the person who is irradiated does not feel the glare when the face is irradiated with the infrared rays 212. The foregoing achieves driving comfort and facilitates imaging of human faces by the in-vehicle imaging unit 201.

As a result of the adjustments made of the in-vehicle imaging unit 201 described above, the in-vehicle imaging unit 201 images the range 250 which is irradiated with the infrared rays by the infrared irradiation unit 203 and over which the face is likely to exist. While the vehicle 1 is driven, the in-vehicle imaging unit 201 continues imaging the face of the driver 302 and outputs to the control unit 10, in sequence, image data captured through the imaging. The imaging by the in-vehicle imaging unit 201 is performed periodically at predetermined time intervals in order to determine the drowsiness level.

In determining the drowsiness level, the control unit 10 detects position and orientation of the face included in a still image or a moving image imaged in the vehicle compartment 2a, and states of, for example, eyes (e.g., determining an eyes-open state, visual line direction, and a blinking cycle using Purkinje images), the mouth, and other parts of the face, thereby evaluating (determining) the drowsiness level.

The following details different drowsiness levels and conditions associated therewith.

(1) Drowsiness Level=1

The drowsiness level=1 is a condition in which the driver does not seem to be sleepy at all, corresponding to a state involving quick and frequent movements of visual line, steady intervals of blinking twice per two seconds, and active movements accompanying body movements.

(2) Drowsiness Level=2

The drowsiness level=2 is a condition in which the driver seems to be relatively sleepy, corresponding to a state involving slow movements of visual line and an open mouth.

(3) Drowsiness Level=3

The drowsiness level=3 is a condition in which the driver seems, at a glance, to be sleepy, corresponding to a state involving slow but frequent blinking, mouth movements, sitting position changes, and touching his or her face by hand.

(4) Drowsiness Level=4

The drowsiness level=4 is a condition in which the driver seems to be fairly sleepy, corresponding to a state involving slow blinking and movements of visual line, deliberate blinking, unnecessary movements such as shaking his or her head and raising and lowering his or her shoulders, frequent yawning, and deep breathing.

(5) Drowsiness Level=5

The drowsiness level=5 is a condition in which the driver seems to be extremely sleepy, corresponding to a state involving closed eyelids and head leaning forward and backward.

A timing at which the collision damage reduction brake is activated is set to a time point at which a time to collision (TTC) becomes less than a predetermined threshold, where TTC represents a time period upon expiration of which the vehicle is estimated to collide with the estimated target object 20.

The following describes a technique that may be used for setting the time period TTC upon expiration of which the vehicle is estimated to collide with the estimated target object 20.

The response time of the driver in each drowsiness level is first considered.

Assume that the time period upon expiration of which the collision damage reduction brake is activated is set to, for example, 1.4 seconds.

For the drowsiness level=1 or the drowsiness level=2, the response time of an ordinary driver is assumed to be about 2.4 seconds that represent the collision damage reduction brake activation time to which a response lag (of about 1 second) by aging is added.

The response time extends by about 0.75 second for each increase of one step of the drowsiness level.

Thus, for the drowsiness level=3, the response time extends by about 0.75×2=1.5 seconds compared with the drowsiness level=1. Thus, the response time=2.4 seconds+1.5 seconds=3.9 seconds (=4.0 seconds).

Similarly, for the drowsiness level=4, the response time extends by about 0.75 second compared with the drowsiness level=3. Thus, the response time=4.0 seconds+0.75 second=4.75 seconds.

For the drowsiness level=5, the response time extends by about 0.75 second compared with the drowsiness level=4. Thus, the response time=4.75 seconds+0.75 second=5.5 seconds.

Consider a case in which the vehicle is run at a speed of 100 km/hr as on a freeway. Because it takes the vehicle about 3.6 seconds to travel 100 m, it is appropriate that the vehicle maintain a distance of 100 m from a preceding vehicle.

From the foregoing conditions, the driving support system 100 maintains a distance of 100 m from the preceding vehicle for the drowsiness level=1 or the drowsiness level=2 and the control unit 10 automatically changes the driving support details so as to achieve the driving difficulty region on a level on which the driving support system 100 is capable of assuring safety, thus setting the time period TTC upon expiration of which the vehicle is estimated to collide with the estimated target object 20=2.5 seconds (>2.4 seconds).

The driving support system 100 maintains a distance of 100 m from the preceding vehicle for the drowsiness level=3 and the control unit 10 automatically changes the driving support details so as to achieve the driving difficulty region on a level on which the driving support system 100 is capable of assuring safety, thus setting the time period TTC upon expiration of which the vehicle is estimated to collide with the estimated target object 20=4.0 seconds.

For the drowsiness level=4, the driving support system 100 maintains a distance of 100 m from the preceding vehicle and the control unit 10 automatically changes the driving support details so as to achieve the driving difficulty region on a level on which the driving support system 100 is capable of assuring safety, thus setting the time period TTC upon expiration of which the vehicle is estimated to collide with the estimated target object 20=4.75 seconds.

For the drowsiness level=5, the driving support system 100 maintains a distance of 100 m from the preceding vehicle and the control unit 10 automatically changes the driving support details so as to achieve the driving difficulty region on a level on which the driving support system 100 is capable of assuring safety, thus setting the time period TTC upon expiration of which the vehicle is estimated to collide with the estimated target object 20=5.5 seconds.

The following examines the state of the driver's concentration on driving using, as an example, an operation during lane changing.

When the distance from the preceding vehicle is shorter during running at a specified speed, the driving support system 100 basically performs a lane change. In the present embodiment, however, different types of control are performed depending on the state of the driver's concentration on driving.

The following first describes the state of the driver's concentration on driving.

Let a % be a time ratio per unit time during which the driver looks forward of the vehicle, b % be a time ratio per unit time during which the driver looks at an inside rearview mirror, and c % be a time ratio per unit time during which the driver looks at a door mirror. Here, it is assumed that $a+b+c\approx100$.

(1) State in which the Driver Frequently Performs Peripheral Monitoring (High Concentration)

The present embodiment assumes that the peripheral monitoring is frequently performed when the time ratio a per unit time during which the driver looks forward of the vehicle substantially satisfies the following condition:

$b+c \leq a \leq 2\times(b+c).$ (2) State in which the Driver Barely Performs Peripheral Monitoring The present embodiment assumes that the peripheral monitoring is barely performed when the time ratio a per unit time during which the driver looks forward of the vehicle substantially satisfies the following condition:

$a >> b,c.$

Specifically, the driver only looks forward and pays little attention to sides and rear of the vehicle.

(3) State in which the Driver Barely Performs Peripheral Monitoring and Barely Confirms Safety Additionally, the present embodiment assumes that the peripheral monitoring and safety confirmation are barely performed when a relation among the time ratio a per unit time during which the driver looks forward of the vehicle, the time ratio b, and the time ratio c, or conditions including the time ratio a substantially satisfy the following condition:

$a+b+c<<100$ (substantially no attention is paid to peripheral)

or, $a\approx100$ and the drowsiness level=3 or higher.

In the state in which the driver frequently performs peripheral monitoring, the driving support system 100 automatically changes the driving support details such that the driving difficulty region on a level on which the driving support system 100 is capable of assuring safety is achieved. Then, the driving support system 100 controls so as to perform a lane change as detailed below.

Specifically, let a following vehicle following a host vehicle after the lane change be defined as the estimated target object; the lane change is to be performed when the time period TTC, upon expiration of which the following vehicle is estimated to collide, is equal to or longer than a first time T1, specifically, $TTC \geq T1.$ More specifically, the lane change is controlled to be performed when, for example, TTC≥T1=2.5 seconds.

In the state in which the driver barely performs peripheral monitoring, the driving support system 100 automatically changes the driving support details such that the driving difficulty region on a level on which the driving support system 100 is capable of assuring safety is achieved. Then, the control unit 10 of the driving support system 100 controls so as to perform a lane change as detailed below. Specifically, let the following vehicle following the host vehicle after the lane change be defined as the estimated target object; the lane change is to be performed when the time period TTC, upon expiration of which the following vehicle (estimated target object) is estimated to collide, is equal to or longer than a second time T2, specifically, $TTC \geq T2.$ More specifically, the lane change is controlled to be performed when, for example, TTC≥T2=5.5 seconds on the assumption, for example, that the drowsiness level of the driver driving the following vehicle is 5.

In the state in which the driver barely performs peripheral monitoring and barely confirms safety, operations by the driver cannot be expected much during lane changing and the driving support system 100 automatically changes the driving support details such that the driving difficulty region on a level on which the driving support system 100 is capable of assuring safety is achieved. The control unit 10 of the driving support system 100 controls so as to follow the preceding vehicle that runs immediately ahead of the host vehicle without performing a lane change. Specifically, the control unit 10 controls so as to maintain a distance from the preceding vehicle in accordance with the running speed of the preceding vehicle, instead of allowing the vehicle to run at a speed set by cruise control.

In the state in which the driver frequently performs peripheral monitoring and during cruise control that maintains a set constant speed without the driver's need to keep depressing an accelerator pedal, the driving support system 100 automatically changes the driving support details such that the driving difficulty region on a level on which the driving support system 100 is capable of assuring safety is achieved. Then, when the time period TTC, upon expiration of which the host vehicle is estimated to collide with an estimated target object (e.g., a preceding vehicle running immediately ahead of the host vehicle), is 2.5 seconds, the control unit 10 of the driving support system 100 performs an inter-distance control function that reduces the running speed so as to maintain a distance from the preceding vehicle.

In the state in which the driver barely performs peripheral monitoring and barely confirms safety, the driving support system 100, on the assumption that the drowsiness level of the driver corresponds to 5, automatically changes the driving support details such that the driving difficulty region on a level on which the driving support system 100 is capable of assuring safety is achieved. Then, when the time period TTC, upon expiration of which the host vehicle is estimated to collide with, for example, an estimated target object (e.g., a preceding vehicle running immediately ahead of the host vehicle), is 5.5 seconds, the control unit 10 of the driving support system 100 performs the inter-distance control function that reduces the running speed so as to maintain a distance from the preceding vehicle.

In the state in which the driver barely performs peripheral monitoring, which is a state between the state in which the driver frequently performs peripheral monitoring and the state in which the driver barely performs peripheral monitoring and barely confirms safety, the driving support system 100 automatically changes the driving support details such that the driving difficulty region on a level on which the driving support system 100 is capable of assuring safety is achieved. Then, when the time period TTC, upon expiration of which the host vehicle is estimated to collide with, for example, an estimated target object (e.g., a preceding vehicle running immediately ahead of the host vehicle), is a predetermined time (e.g., 3.5 seconds) between 2.5 seconds and 5.5 seconds, the control unit 10 of the driving support system 100 performs the inter-distance control function that reduces the running speed so as to maintain a distance from the preceding vehicle.

The following examines the state of peripheral monitoring by the driver using, as an example, parking speed control during reversing.

The present embodiment is configured so as to control the reversing speed in accordance with the state of peripheral monitoring by the driver during reversing.

The following first describes the state of peripheral monitoring by the driver during reversing.

In the description that follows, let a % be a time ratio per unit time during which the driver looks forward of the vehicle, b % be a time ratio per unit time during which the driver looks left rearward, and c % be a time ratio per unit time during which the driver looks right rearward, when no images (hereinafter referred to as rear camera images) by the imaging unit 11R are available (not displayed). Here, it is assumed that $a+b+c \approx 100$.

When the rear camera images are available (displayed), let a % be a time ratio per unit time during which the driver looks forward of the vehicle, b % be a time ratio per unit time during which the driver looks left rearward, c % be a time ratio per unit time during which the driver looks right rearward, and d % be a time ratio per unit time during which the driver looks at the rear camera images. Here, it is assumed that $a+b+c+d \approx 100$.

(1) State in which the Driver Performs Peripheral Monitoring in a Uniform Manner The present embodiment assumes that the peripheral monitoring is performed in a uniform manner without the rear camera images when:

$a \approx b \approx c$.

The present embodiment assumes that the peripheral monitoring is performed in a uniform manner with the rear camera images when:

$a \approx b \approx c \approx d$.

(2) State in which the Driver Performs Peripheral Monitoring in a Non-Uniform Manner The present embodiment assumes that the peripheral monitoring is performed in a non-uniform manner without the rear camera images when:

$a >> b,c$; or $b >> a,c$; or $c >> a,b$.

The present embodiment assumes that the peripheral monitoring is performed in a non-uniform manner with the rear camera images when:

$a >> b,c,d$; or $b >> a,c,d$; or $c >> a,b,d$; or $d >> a,b,c$.

(3) State in which the Driver Performs Peripheral Monitoring in a Considerably Non-Uniform Manner The present embodiment assumes that the peripheral monitoring is performed in a considerably non-uniform manner without the rear camera images when at least one of the time ratios a, b, and c is substantially zero.

The present embodiment assumes that the peripheral monitoring is performed in a considerably non-uniform manner with the rear camera images when at least one of the time ratios a, b, c, and d is substantially zero.

In the state in which the driver performs peripheral monitoring in a uniform manner, the driving support system 100 automatically changes the driving support details such that the driving difficulty region on a level on which the driving support system 100 is capable of assuring safety is achieved. The control unit 10 of the driving support system 100 performs the parking speed control such that the reversing speed is a first reversing speed (e.g., 6 km/hr) that is the fastest speed.

In the state in which the driver performs peripheral monitoring in a non-uniform manner, the driving support system 100 automatically changes the driving support details such that the driving difficulty region on a level on which the driving support system 100 is capable of assuring safety is achieved. The control unit 10 of the driving support system 100 performs the parking speed control such that the reversing speed is a second reversing speed (e.g., 4 km/hr) that is the second fastest speed.

In the state in which the driver performs peripheral monitoring in a considerably non-uniform manner, the driving support system 100 automatically changes the driving support details such that the driving difficulty region on a level on which the driving support system 100 is capable of assuring safety is achieved. The control unit 10 of the driving support system 100 performs the parking speed control such that the reversing speed is a third reversing speed (e.g., 2 km/hr) that is the slowest speed.

The following describes operations in the embodiment.

The following first describes control for the collision damage reduction brake activation timing and lane changing.

Figure 5:
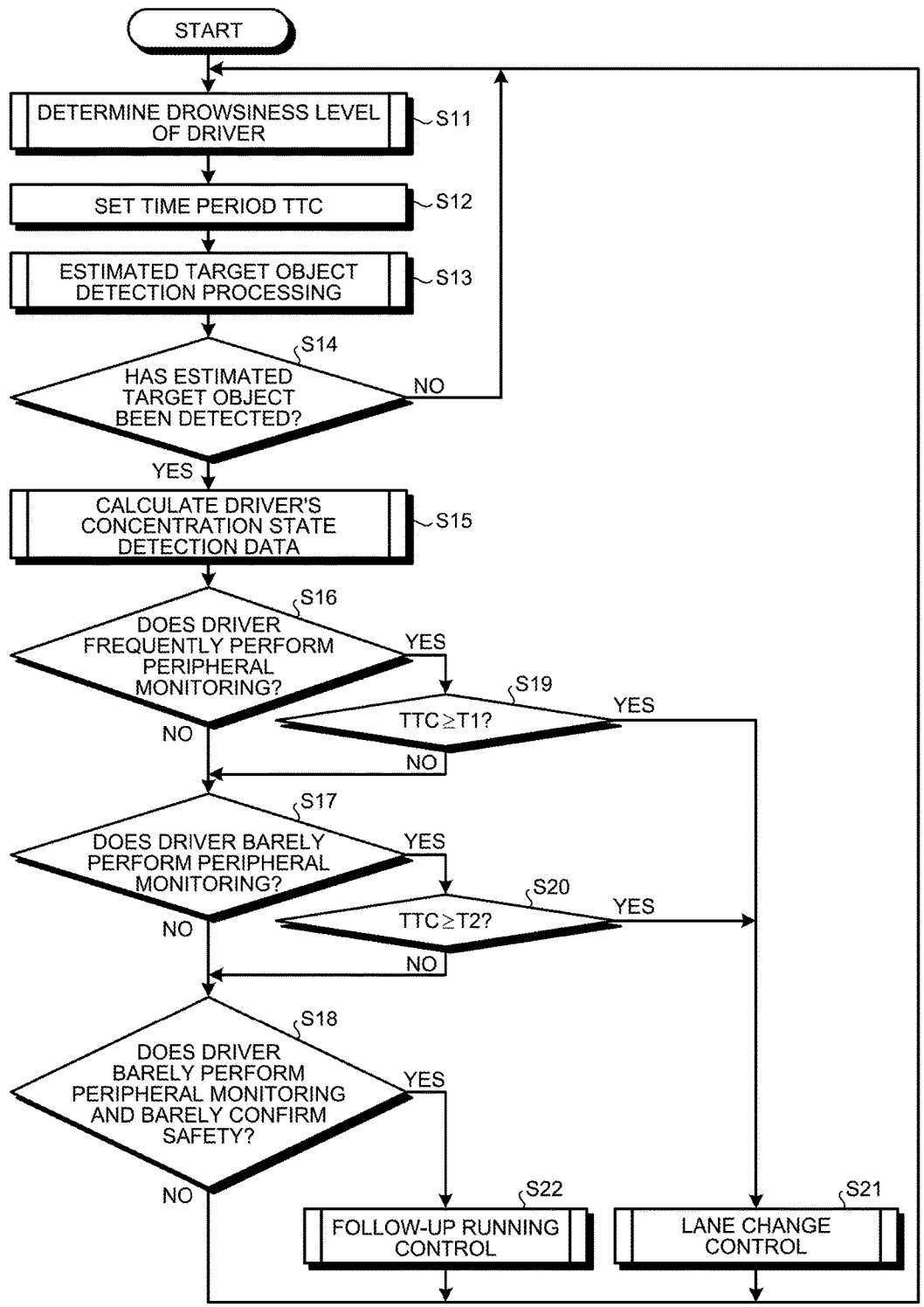
FIG. 5 is an operation flowchart (part 1) in the embodiment.

FIG. 5 is an operation flowchart (part 1) in the embodiment.

The control unit 10 first determines the drowsiness level (Step S11).

The control unit 10 next sets the time period TTC upon expiration of which the vehicle 1 is estimated to collide with the estimated target object 20 in accordance with the drowsiness level determined at Step S11 (Step S12).

The control unit 10 then performs processing for detecting the estimated target object 20 that may be, for example, a preceding vehicle, a following vehicle, or an obstacle (Step S13) and determines whether the estimated target object 20 has been detected (Step S14).

If it is determined in the determination made at Step S14 that no estimated target object has been detected (No at Step S14), the control unit 10 maintains the control state and performs processing again at Step S11 and subsequent similar processing.

If it is determined in the determination made at Step S14 that an estimated target object has been detected (Yes at Step S14), the control unit 10 performs processing for calculating the driver's concentration state detection data (Step S15).

Then, the control unit 10 determines, on the basis of calculations of the driver's concentration state detection data obtained at Step S15, whether the driver frequently performs peripheral monitoring (Step S16).

More specifically, the control unit 10 determines whether the time ratio a substantially satisfies the following condition:

$$b+c \leq a \leq 2\times(b+c),$$

where a % is the time ratio per unit time during which the driver looks forward of the vehicle, b % is the time ratio per unit time during which the driver looks at an inside rearview mirror, and c % is the time ratio per unit time during which the driver looks at a door mirror (where a+b+c≈100).

If it is determined in the determination made at Step S16 that the driver frequently performs peripheral monitoring (Yes at Step S16), the control unit 10 determines whether the time period TTC upon expiration of which the vehicle 1 is estimated to collide with the estimated target object 20 is equal to or longer than the first time T1 (Step S19).

If it is determined in the determination made at Step S19 that the time period TTC upon expiration of which the vehicle 1 is estimated to collide with the estimated target object 20 is equal to or longer than the first time T1, specifically, $$TTC \geq T1$$

(Yes at Step S19), the control unit 10 controls the suspension unit 4, the brake unit 6, and the steering unit 7, thereby performing the lane change control for changing the running lane in order to perform a collision avoidance operation with respect to the estimated target object 20 with care not to place a burden on the vehicle 1 or occupants including the driver (Step S21). The control unit 10 then performs processing again at Step S11 and subsequent similar processing.

The following describes the driving support control (vehicle behavior control) including the lane change control.

Figure 6:
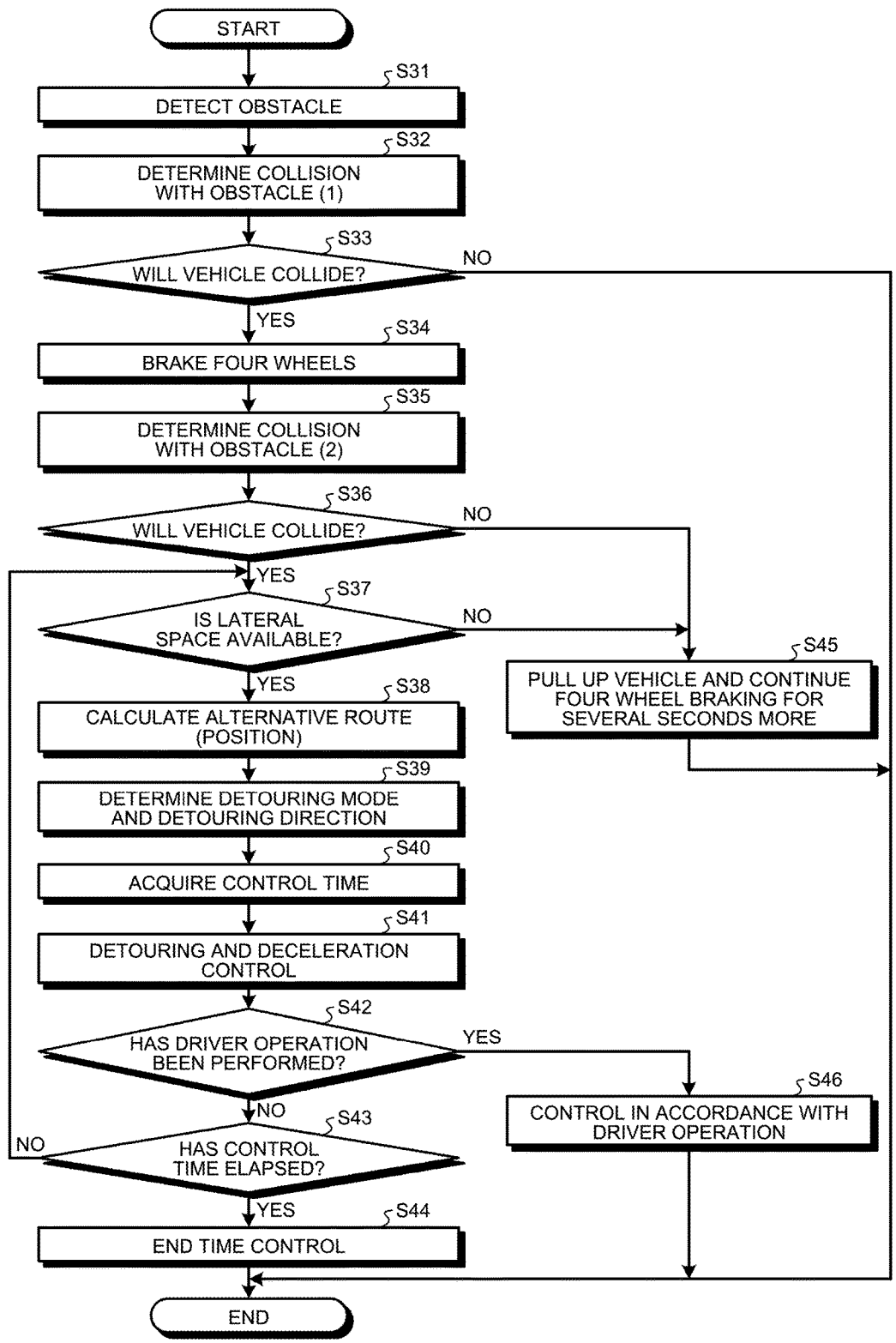
FIG. 6 is an operation flowchart for driving support control including lane change control.

FIG. 6 is an operation flowchart for the driving support control including the lane change control.

Figure 7:
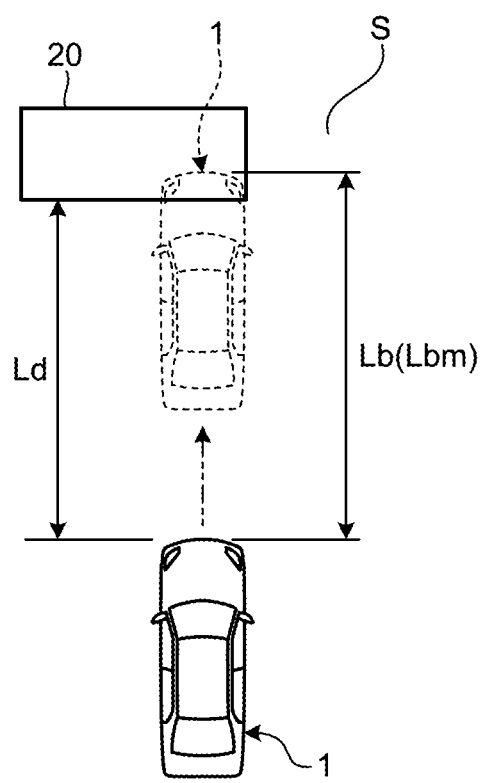
FIG. 7 is a schematic diagram (bird's-eye view) illustrating an exemplary condition under which a vehicle, when decelerated while traveling in a straight-ahead direction, is determined to collide with an obstacle.

FIG. 7 is a schematic diagram (bird's-eye view) illustrating an exemplary condition under which the vehicle, when decelerated while traveling in a straight-ahead direction, is determined to collide with an obstacle.

Figure 8:
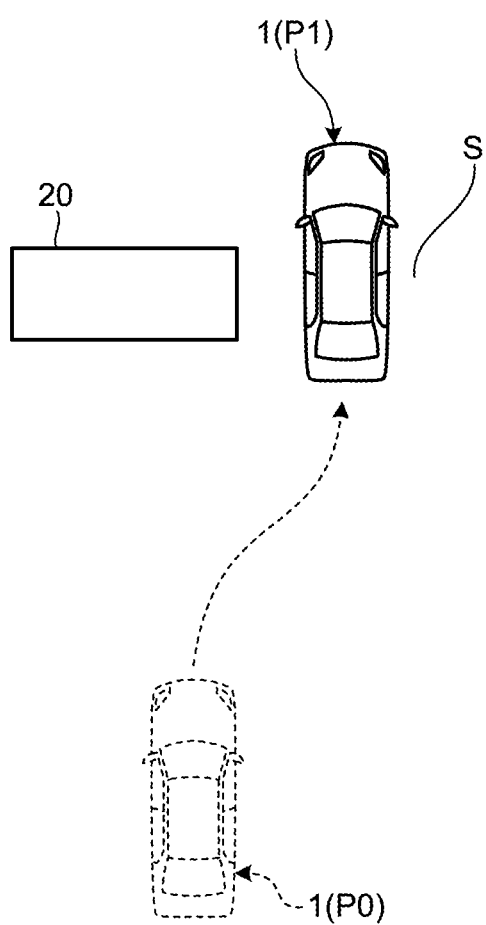
FIG. 8 is a schematic diagram (bird's-eye view) illustrating exemplary behavior of a vehicle controlled by the driving support system.

FIG. 8 is a schematic diagram (bird's-eye view) illustrating exemplary behavior of a vehicle controlled by the driving support system.

As illustrated in FIG. 7, when it is estimated that the vehicle 1, if decelerated while traveling in a straight-ahead direction, collides with the estimated target object 20 disposed ahead of the vehicle 1, the control unit 10 controls different elements (e.g., the brake unit 6 and the steering unit 7) of the vehicle 1 so as to perform a lane change toward a space S, while circumventing the estimated target object 20, provided that the space S into which the vehicle 1 can move is available on a lateral side of the estimated target object 20 as illustrated in FIG. 8. The space S, as used herein, refers to, for example, a lane along which the host vehicle 1 can travel and a region in which the estimated target object 20 does not exist.

Specifically, the control unit 10 detects the estimated target object 20 (see FIG. 7) forward of the vehicle 1 (Step S31).

The control unit 10 then acquires, using data obtained by, for example, the imaging units 11 and the radar units 12, the position (the spaced distance Ld from the vehicle 1) of the estimated target object 20 that satisfies previously established conditions such as size (Step S32).

Next, the control unit 10 determines whether the vehicle 1, if decelerated (braking control) while traveling in a straight-ahead direction, collides with the estimated target object 20 detected at S10, specifically, whether a calculated braking distance Lb is equal to or longer than the spaced distance Ld (Step S33).

It is here noted that the braking distance Lb is calculated as follows. For example, the control unit 10 acquires speed of the vehicle 1 at a specific point in time and then acquires the braking distance Lb corresponding to the acquired speed of the vehicle 1 by referring to data (e.g., a table or a function) that indicates a correspondence between the speed (vehicle speed) stored in the storage 10*n* (e.g., the ROM 10B or a flash memory 10D) and the braking distance Lb (stopping distance; a distance the vehicle 1 travels before being brought to a stop when the vehicle 1 is decelerated (braking control) while traveling in a straight-ahead direction; see FIG. 7) when maximum deceleration occurs.

In the determination at Step S33, the control unit 10 compares the braking distance Lb with the spaced distance Ld and, if the braking distance Lb is equal to or longer (greater) than the spaced distance Ld (Yes at Step S33), the control unit 10 determines that the vehicle 1 will or is highly likely to collide. The control unit 10 then controls the brake unit 6 of each of the wheels 3 via the brake system 61, thereby braking the four wheels 3 to, for example, perform full braking (Step S34).

If it is determined in the determination made at Step S33 that the braking distance Lb is shorter than the spaced distance Ld (No at Step S33), the control unit 10 determines that the vehicle 1 does not (or is unlikely or less likely to) collide, thus terminating the series of processing.

The control unit 10, under the operation of the brake units 6, acquires again the position (a new spaced distance Ld from the vehicle 1) of the same estimated target object 20 using data obtained from, for example, the imaging units 11 or the radar units 12 (Step S35).

Next, the control unit 10 determines whether the vehicle 1, if decelerated (braking control) while traveling in a straight-ahead direction under the operation of the brake units 6, collides with the estimated target object 20 (Step S36).

Thus, at Step S36, the control unit 10 can make the determination as to whether a collision occurs with even higher accuracy for the following reason. Specifically, the determination at Step S36 is made under the condition of the wheels 3 being braked at Step S34, so that the control unit 10 can incorporate in the determination the condition of each of the four wheels 3 being braked or not (rotating conditions of the wheels 3, running condition of the vehicle 1, response of each element to a braking control input).

If it is determined at Step S36 that a braking distance Lbm at the specific point in time is shorter (smaller) than the spaced distance Ld (No at Step S36), the control unit 10 determines that the vehicle 1 will not or is less likely to collide. The control unit 10 pulls up the vehicle and then continues braking the four wheels for several seconds thereafter (Step S45) before terminating the series of processing.

If it is determined at Step S36 that the newly calculated braking distance Lbm is equal to or longer (greater) than the spaced distance Ld (Yes at Step S36), the control unit 10 determines that the vehicle will or is highly likely to collide and determines whether the space S, into which the vehicle 1 can move, is available on a lateral side of the estimated target object 20 (Step S37).

If it is determined at Step S37 that no space into which the vehicle 1 can move is available on the lateral side of the estimated target object 20 (No at Step S37), the control unit 10 pulls up the vehicle and then continues braking the four wheels for several seconds thereafter (Step S45). After that, the control unit 10 terminates the series of processing.

If it is determined at Step S37 that the space S, into which the vehicle 1 can move, is available on the lateral side of the estimated target object 20 (Yes at Step S37), the control unit 10 calculates an alternative route (position) with respect to the estimated target object 20 (Step S38), thereby determining a detouring direction (Step S39).

The control unit 10 next acquires control time T (time at which the control is performed, control period, control time length, control end time (time point)) during which the detouring control is performed (Step S40).

The control time T represents a value established to correspond to a vehicle speed V on the basis of, for example, a predetermined table or function. The control time T is set to be shorter, for example, at higher vehicle speeds V. This is because the vehicle takes a shorter time at higher vehicle speeds V to move from a current position P0 (see FIG. 8) to an alternative position P1 (see FIG. 8) for circumventing the estimated target object 20.

More specifically, the control time T is set as a period of time required for the vehicle 1 to move from a current lane on a road (e.g., a freeway) to an adjacent lane while running at the vehicle speed V. The vehicle 1 takes a shorter time to move between lanes at higher vehicle speeds V. Thus, for example, the control for the vehicle 1 to avoid collision with the estimated target object 20 can be prevented from being performed (continued) uselessly after the collision with the estimated target object 20 has been avoided.

It is noted that Step S40 is performed, for example, only at a first timing and is not performed at second and subsequent timings following a loop of Step S36 to Step S42.

Additionally, the control unit 10 may change the steering angle or the steering speed according to the vehicle speed V with a constant control time T, thereby being capable of adjusting a movement amount of the vehicle 1. In this case, the control unit 10, for example, decreases at least either of the steering angle or the steering speed with an increasing vehicle speed V.

The control unit 10 then controls different elements so that the vehicle 1 circumvents the estimated target object 20 through the determined alternative route (Step S41).

In the middle of lane running control such as lane changing, the control unit 10 determines whether a driver operation performed by the driver to turn the steering wheel has been performed (Step S42).

If the driver operation has been detected through the determination made at Step S42 (Yes at Step S42), the control unit 10 performs the control in accordance with the operation by the driver instead of the lane running control including the lane changing (Step S44).

Specifically, in the present embodiment, as described previously, the driving support system 100 prefers that the driver himself or herself adapts to the situation without excessively relying on the driving support system 100. Specifically, the present embodiment prevents a type of control different from that achieved by the driver operation from being performed.

If the driver operation has not been detected through the determination made at Step S42 (No at Step S42), the control unit 10 determines whether time since the start of the lane running control exceeds the control time T (Step S43).

If it is determined in the determination made at Step S43 that the time since the start of the lane running control has not exceeded the control time T yet (No at Step S43), the control unit 10 performs processing at Step S37 and subsequent similar processing again.

If it is determined in the determination made at Step S43 that the time since the start of the alternative route running control has exceeded the control time T (Yes at Step S43), the control unit 10 performs end time control (stabilization control) that, upon terminating the alternative route running control, brings the vehicle 1 into a condition under which the vehicle 1 can more steadily run after the end of the control (Step S44).

Reference is made back to FIG. 5.

If it is determined in the determination made at Step S19 that the time period TTC upon expiration of which the vehicle 1 is estimated to collide with the estimated target object 20 is shorter than the first time T1, specifically, $$TTC < T1$$

(No at Step S19), the control unit 10 determines whether the driver barely performs peripheral monitoring (Step S17).

More specifically, the control unit 10 determines whether the time ratio a % per unit time during which the driver looks forward of the vehicle substantially satisfies the following condition:

$$a >> b, c.$$

If it is determined in the determination made at Step S17 that the driver barely performs peripheral monitoring (Yes at Step S17), the control unit 10 determines whether the time period TTC upon expiration of which the vehicle 1 is estimated to collide with the estimated target object 20 is equal to or longer than the second time T2 (Step S20).

If it is determined in the determination made at Step S20 that the time period TTC upon expiration of which the vehicle 1 is estimated to collide with the estimated target object 20 is equal to or longer than the second time T2, specifically, $$TTC \geq T2$$

(Yes at Step S20), the control unit 10 controls the suspension unit 4, the brake unit 6, and the steering unit 7, thereby performing the lane change control for changing the running lane in order to perform a collision avoidance operation with respect to the estimated target object 20 with care not to place a burden on the vehicle 1 or occupants including the driver (Step S21). The control unit 10 then performs processing again at Step S11 and subsequent similar processing.

If it is determined in the determination made at Step S20 that the time period TTC upon expiration of which the vehicle 1 is estimated to collide with the estimated target object 20 is shorter than the second time T2, specifically, $$TTC<T2$$

(No at Step S20), the control unit 10 determines whether the driver barely performs peripheral monitoring and barely confirms safety (Step S18).

More specifically, the control unit 10 determines whether a relation among the time ratio a, the time ratio b, and the time ratio c, or conditions including the time ratio a satisfy the following condition:

$a+b+c<<100$ (substantially no attention is paid to peripheral)

or, $a \approx 100$ and the drowsiness level=3 or higher.

If it is determined in the determination made at Step S20 that the driver barely performs peripheral monitoring and barely confirms safety (Yes at Step S18), control is performed so as to follow the immediately preceding vehicle without allowing a lane change to be performed and control is performed such that the distance from the preceding vehicle is maintained in accordance with the running speed of the preceding vehicle instead of the speed set by the cruise control (Step S21).

If it is determined in the determination made at Step S20 that the driver's performance of peripheral monitoring and confirmation of safety is not bare, specifically, the driver frequently performs peripheral monitoring and that the time period TTC upon expiration of which the vehicle 1 is estimated to collide with the estimated target object 20 is shorter than the first time T1, or that the driver barely performs peripheral monitoring and that the time period TTC upon expiration of which the vehicle 1 is estimated to collide with the estimated target object 20 is shorter than the second time T2, the control unit 10 performs processing again at Step S11 and subsequent similar processing.

As described above, the driving support system 100 in the embodiment operates so as to ensure a sufficient time for the driver himself or herself to adapt to a situation without the driver's excessive reliance on the driving support system 100, and so as to reduce collision damage even when the driver himself or herself is unable to adapt to the situation. Specifically, the driving support system 100 automatically changes the driving support details such that the driving difficulty region on a level on which the driving support system 100 is capable of assuring safety is achieved, thereby providing support toward safety assurance.

The following describes operations for adaptive cruise control that, while maintaining a set constant speed without the need for the driver to keep depressing the accelerator pedal, provides the inter-vehicle distance control function.

Figure 9:
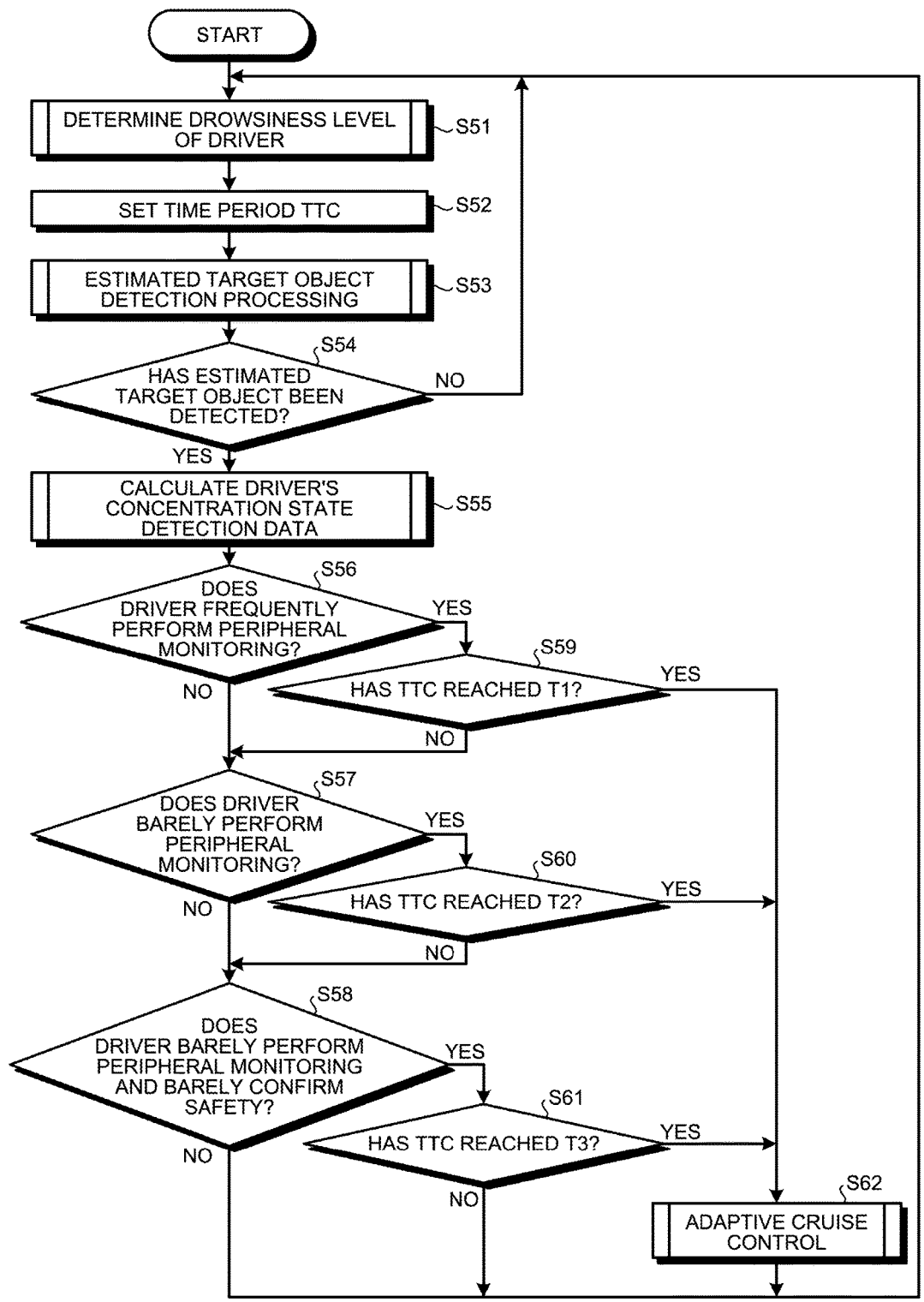
FIG. 9 is an operation flowchart (part 2) in the embodiment.

FIG. 9 is an operation flowchart (part 2) in the embodiment.

The control unit 10 first determines the drowsiness level (Step S51).

In accordance with the drowsiness level determined at Step S51, the control unit 10 sets the time period TTC upon expiration of which the vehicle 1 is estimated to collide with the estimated target object 20 (Step S52).

The control unit 10 then performs processing for detecting the estimated target object 20 such as a preceding vehicle, a following vehicle, or an obstacle (Step S53) and determines whether the estimated target object 20 has been detected (Step S54).

If it is determined in the determination made at Step S54 that no estimated target object has been detected (No at Step S54), the control unit 10 maintains the control state and performs processing again at Step S51 and subsequent similar processing.

If it is determined in the determination made at Step S54 that an estimated target object has been detected (Yes at Step S54), the control unit 10 performs processing for calculating the driver's concentration state detection data (Step S55).

Then, the control unit 10 determines, on the basis of calculations of the driver's concentration state detection data obtained at Step S55, whether the driver frequently performs peripheral monitoring (Step S56), similar to the case of Step S16 as illustrated in FIG. 5.

If it is determined in the determination made at Step S56 that the driver frequently performs peripheral monitoring (Yes at Step S56), the control unit 10 determines whether the time period TTC upon expiration of which the vehicle 1 is estimated to collide with the estimated target object 20 has reached the first time T1 (e.g., 2.5 seconds) (Step S59).

If it is determined in the determination made at Step S59 that the time period TTC upon expiration of which the vehicle 1 is estimated to collide with the estimated target object 20 has reached the first time T1 (Yes at Step S59), the control unit 10 controls the suspension unit 4, the brake unit 6, and the steering unit 7, thereby performing the adaptive cruise control that controls the inter-vehicle distance, while maintaining the set constant speed (Step S62). The control unit 10 then performs processing again at Step S51 and subsequent similar processing.

If it is determined in the determination made at Step S59 that the time period TTC upon expiration of which the vehicle 1 is estimated to collide with the estimated target object 20 has not reached the first time T1 yet (No at Step S59), the control unit 10 determines whether the driver barely performs peripheral monitoring (Step S57).

If it is determined in the determination made at Step S57 that the driver barely performs peripheral monitoring (Yes at Step S57), the control unit 10 determines whether the time period TTC upon expiration of which the vehicle 1 is estimated to collide with the estimated target object 20 has reached the second time T2 (e.g., 3.5 seconds) (Step S60).

If it is determined in the determination made at Step S60 that the time period TTC upon expiration of which the vehicle 1 is estimated to collide with the estimated target object 20 has reached the second time T2 (Yes at Step S60), the control unit 10 controls the suspension unit 4, the brake unit 6, and the steering unit 7, thereby performing the adaptive cruise control that controls the inter-vehicle distance, while maintaining the set constant speed (Step S62). The control unit 10 then performs processing again at Step S51 and subsequent similar processing.

If it is determined in the determination made at Step S60 that the time period TTC upon expiration of which the vehicle 1 is estimated to collide with the estimated target object 20 has not reached the second time T2 yet (No at Step S60), the control unit 10 determines whether the driver barely performs peripheral monitoring and barely confirms safety (Step S58).

If it is determined in the determination made at Step S58 that the driver barely performs peripheral monitoring and barely confirms safety (Yes at Step S58), the control unit 10 determines whether the time period TTC upon expiration of which the vehicle 1 is estimated to collide with the estimated target object 20 has reached a third time T3 (e.g., 5.5 seconds) (Step S61).

If it is determined in the determination made at Step S61 that the time period TTC upon expiration of which the vehicle 1 is estimated to collide with the estimated target object 20 has reached the third time T3 (Yes at Step S61), the control unit 10 controls the suspension unit 4, the brake unit 6, and the steering unit 7, thereby performing the adaptive cruise control that controls the inter-vehicle distance, while maintaining the set constant speed (Step S62). The control unit 10 then performs processing again at Step S51 and subsequent similar processing.

If it is determined in the determination made at Step S61 that the time period TTC upon expiration of which the vehicle 1 is estimated to collide with the estimated target object 20 has not reached the third time T3 yet (No at Step S61), the control unit 10 performs processing again at Step S51 and subsequent similar processing.

As described above, the driving support system 100 in the embodiment ensures a sufficient time for the driver himself or herself to adapt to a situation without the driver's excessive reliance on the driving support system 100 and, even when the driver himself or herself is unable to adapt to the situation, performs the adaptive cruise control, thereby achieving safety even more reliably.

The following describes operations for the parking speed control during reversing as the driving support control.

FIG. 10 is an operation flowchart (part 3) in the embodiment.

The control unit 10 first determines whether the condition represents performance of parking through reversing (Step S71).

If it is determined in the determination made at Step S71 that the condition does not represent performance of parking through reversing (No at Step S71), the control unit 10 terminates the processing.

If it is determined in the determination made at Step S71 that the condition represents performance of parking through reversing (Yes at Step S71), the control unit 10 performs processing for calculating the driver's concentration state detection data (Step S72).

Specifically, when no images (hereinafter referred to as rear camera images) by the imaging unit 11R are available (no images displayed), let a % be a time ratio per unit time during which the driver looks forward of the vehicle, b % be a time ratio per unit time during which the driver looks left rearward, and c % be a time ratio per unit time during which the driver looks right rearward (where, a+b+c≈100).

When the rear camera images are available (displayed), let a % be a time ratio per unit time during which the driver looks forward of the vehicle, b % be a time ratio per unit time during which the driver looks left rearward, c % be a time ratio per unit time during which the driver looks right rearward, and d % be a time ratio per unit time during which the driver looks at the rear camera images, where, a+b+c+d≈100.

Then, the control unit 10 determines, on the basis of calculations of the driver's concentration state detection data obtained at Step S72, whether the driver performs peripheral monitoring in a uniform manner (Step S73).

Specifically, when no rear camera images are available, the control unit 10 assumes that the driver performs peripheral monitoring in a uniform manner when $a \approx b \approx c$.

When the rear camera images are available, the control unit 10 assumes that the driver performs peripheral monitoring in a uniform manner when $a \approx b \approx c \approx d$.

If it is determined in the determination made at Step S73 that the driver performs peripheral monitoring in a uniform manner (Yes at Step S73), the control unit 10 performs reverse parking control at a first reverse speed (e.g., 6 km/hr) (Step S76). The control unit 10 then performs processing again at Step S71 and subsequent similar processing.

If it is determined in the determination made at Step S73 that the driver does not perform peripheral monitoring in a uniform manner, the control unit 10 determines, on the basis of the calculations of the driver's concentration state detection data obtained at Step S72, whether the driver performs peripheral monitoring in a non-uniform manner (Step S74).

Specifically, when no rear camera images are available, the control unit 10 assumes that the peripheral monitoring is performed in a non-uniform manner when:

$a >> b,c$; or $b >> a,c$; or $c >> a,b$.

When the rear camera images are available, the control unit 10 assumes that the peripheral monitoring is performed in a non-uniform manner when:

$a >> b,c,d$; or $b >> a,c,d$; or $c >> a,b,d$; or $d >> a,b,c$.

If it is determined in the determination made at Step S74 that the driver performs peripheral monitoring in a non-uniform manner (Yes at Step S74), the control unit 10 performs the reverse parking control at a second reverse speed (e.g., 4 km/hr) that is slower than the first reverse speed (Step S77). The control unit 10 then performs processing again at Step S71 and subsequent similar processing.

If it is determined in the determination made at Step S74 that the driver does not perform peripheral monitoring in a non-uniform manner, the control unit 10 determines, on the basis of the calculations of the driver's concentration state detection data obtained at Step S72, whether the driver performs peripheral monitoring in a considerably non-uniform manner (Step S75).

Specifically, when no rear camera images are available, the control unit 10 assumes that the driver performs peripheral monitoring in a considerably non-uniform manner when at least one of the time ratios a, b, and c is substantially zero.

When the rear camera images are available, the control unit 10 assumes that the driver performs peripheral monitoring in a considerably non-uniform manner when at least one of the time ratios a, b, c, and d is substantially zero.

If it is determined in the determination made at Step S75 that the driver performs peripheral monitoring in a considerably non-uniform manner (Yes at Step S75), the control unit 10 performs the reverse parking control at a third reverse speed (e.g., 2 km/hr) that is even slower than the second reverse speed (Step S78). The control unit 10 then performs processing again at Step S71 and subsequent similar processing.

If it is determined in the determination made at Step S75 that the driver does not perform peripheral monitoring in a considerably non-uniform manner (No at Step S75), the control unit 10 performs processing again at Step S71 and subsequent similar processing.

As described above, the performance of the parking speed control during reversing as the driving support control can achieve safety even more reliably.

As described above, the driving support system 100 in the embodiment is configured to perform the driving support control such that, when automatically changing the driving support details so as to achieve the driving difficulty region on a level on which the driving support system 100 is capable of assuring safety, the required resource that is assumed to be required for safe driving is exceeded, but not exceeded excessively.

Thus, the driver is given a sufficient time to adapt to a situation for himself or herself without excessively relying on the driving support system 100 and, even when the driver himself or herself is unable to adapt to the situation, safety can be assured even more reliably under various conditions including during lane changing, adaptive cruise control, and reversing.

Additionally, the driving support system 100 is configured generally to give priority to the driving operation by the driver and not to allow the driver to rely on the driving support system. Thus, the driver is given a sufficient time to adapt to a situation for himself or herself. Should the driver himself or herself be unable to adapt to the situation, the driving support system 100 can operate so as to reduce collision damage.

Specifically, the driving support system 100 in the embodiment operates so as to ensure a sufficient time for the driver himself or herself to adapt to a situation without the driver's excessive reliance on the driving support system 100, and so as to reduce collision damage even when the driver himself or herself is unable to adapt to the situation.

Furthermore, when the degree of concentration of the driver is reduced in case, for example, when the driver looks at a signboard outside the vehicle or operates an onboard device such as audio equipment, the driving support system 100 in the embodiment can reduce the vehicle speed, extend the inter-vehicle distance, or otherwise bring the vehicle on a safer side. Thus, safety can be assured even more reliably and the driver can be free of an unnecessary sense of fear.

Additionally, when the degree of concentration of the driver is reduced, driving support is continued on an even safer side. The driver may be readily able to determine that his or her concentration on driving is reduced by identifying the driving support state, so that he or she may take a rest or adapt to the situation even more reliably.

While a certain embodiment of the present invention has been described, the embodiment and modifications thereof are presented by way of example only and are not intended to limit the scope of the invention. Indeed, the embodiment and modifications thereof may be embodied in a variety of other forms and various omissions, substitutions, and changes in the form of the embodiment described herein may be made without departing from the spirit of the invention.

The descriptions given above have not gone into any detail except for the configuration of the vehicle 1 as a four-wheel automobile. The vehicle 1 may nonetheless be configured as, for example, an automobile having an internal combustion engine (engine, not illustrated) as a drive source (internal combustion engine automobile), an automobile having an electric motor (motor, not illustrated) as a drive source (electric automobile, fuel cell automobile, and the like), or an automobile having both of the foregoing as drive sources (hybrid automobile). In addition, various types of transmissions can be mounted on the vehicle 1 and various types of equipment (systems and components) required for driving the internal combustion engine or the electric motor can be mounted on the vehicle 1. Additionally, the system, quantity, layout, and the like of the unit involved in driving the wheels 3 in the vehicle 1 can be set in many varied ways.

EXPLANATIONS OF LETTERS OR NUMERALS 1 vehicle
2 vehicle body
4 suspension unit
6 brake unit
7 steering unit
10 control unit
10n storage
11F, 11R imaging unit
12F, 12R radar unit
20 estimated target object (obstacle)
21 steering portion
22 dashboard
23 monitor unit
24 display unit
25 audio output unit
26 operation input portion
100 driving support system
201 in-vehicle imaging unit
202 steering column
203 infrared irradiation unit
302 driver
DCS0 to DCS4 levels of driver's concentration on driving
SFR required resource that is assumed to be required for performance of safe driving
SR driving support resource

The invention claimed is:

1. A driving support apparatus comprising:
at least one processor configured to
determine driving support control having a driving support resource amount that is capable of assuring required resources with respect to a resource amount that is capable of being assured by a level of a vehicle driver's concentration on driving, the required resources being assumed to be required for safe driving; and
change the driving support control to be performed to driving support control that is determined to be capable of assuring the required resources;
the determining driving support control includes:
a first determination that determines the level of the vehicle driver's concentration on driving; and
a second determination that determines driving support control in which a sum of the resource amount that is capable of being assured by the level of the driver's concentration on driving and the driving support resource amount is equal to or more than the required resources that are assumed to be required for safe driving;
a plurality of types of lane running control are capable of being performed as the driving support control, the types of lane running control each involving a specific estimated point in time at which collision with a following vehicle occurs after a lane change, the first determination includes determining a peripheral monitoring level of the driver as the level of concentration, and the second determination includes identifying, based on the determined peripheral monitoring level, among the types of lane running control involving different estimated points in time at which collision with the following vehicle occurs after the lane change, lane running control including lane changing that results in more than the required resources.

2. The driving support apparatus according to claim 1, wherein, when the determined peripheral monitoring level is such that peripheral monitoring and safety confirmation are barely performed, the second determination includes determining follow-up running control as the lane running control.

3. A driving support apparatus comprising:

at least one processor configured to determine driving support control having a driving support resource amount that is capable of assuring required resources with respect to a resource amount that is capable of being assured by a level of a vehicle driver's concentration on driving, the required resources being assumed to be required for safe driving; and change the driving support control to be performed to driving support control that is determined b to be capable of assuring the required resources;

the determining driving support control includes:

a first determination that determines the level of the vehicle driver's concentration on driving; and a second determination that determines driving support control in which a sum of the resource amount that is capable of being assured by the level of the driver's concentration on driving and the driving support resource amount is equal to or more than the required resources that are assumed to be required for safe driving;

reverse parking speed control is capable of being performed as the driving support control, the first determination includes determining a peripheral monitoring level of the driver as the level of concentration, and the second determination includes identifying, based on the determined peripheral monitoring level, among a plurality of reverse parking speeds, reverse parking speed control having a reverse parking speed that results in more than the required resources.

4. The driving support apparatus according to claim 3, wherein the first determination includes determining the peripheral monitoring level based on a ratio at which the driver looks forward, a ratio at which the driver looks left rearward, and a ratio at which the driver looks right rearward.

5. The driving support apparatus according to claim 4, wherein the first determination includes determining the peripheral monitoring level based on further a ratio at which the driver looks at a rear camera image displayed on a display unit.

6. A computer program product including programmed instructions embodied in and stored on a non-transitory computer readable medium, wherein the instructions, when executed by a computer, cause the computer to perform:

determining driving support control having a driving support resource amount that is capable of assuring required resources with respect to a resource amount that is capable of being assured by a level of a vehicle driver's concentration on driving, the required resources being assumed to be required for safe driving; and changing the driving support control to be performed to driving support control that is determined to be capable of assuring the required resources;

the determining driving support control includes:

a first determination that determines the level of the vehicle driver's concentration on driving; and a second determination that determines driving support control in which a sum of the resource amount that is capable of being assured by the level of the driver's concentration on driving and the driving support resource amount is equal to or more than the required resources that are assumed to be required for safe driving;

reverse parking speed control is capable of being performed as the driving support control, the first determination includes determining a peripheral monitoring level of the driver as the level of concentration, and the second determination includes identifying, based on the determined peripheral monitoring level, among a plurality of reverse parking speeds, reverse parking speed control having a reverse parking speed that results in more than the required resources.

* * * * *